US005761735A

United States Patent [19]
Huon et al.

[11] Patent Number: 5,761,735
[45] Date of Patent: Jun. 2, 1998

[54] CIRCUIT FOR SYNCHRONIZING DATA TRANSFERS BETWEEN TWO DEVICES OPERATING AT DIFFERENT SPEEDS

[75] Inventors: Pierre Huon, Saint Laurent du Var; Rene Glaise, Nice, both of France

[73] Assignee: International Business Machines Corporation, Armonk, N.Y.

[21] Appl. No.: 66,638

[22] Filed: May 25, 1993

Related U.S. Application Data

[63] Continuation of Ser. No. 491,901, Mar. 12, 1990, abandoned.

[30] Foreign Application Priority Data

Apr. 28, 1990 [EP] European Pat. Off. ............ 89480072

[51] Int. Cl.⁶ .................................................. G06F 5/06
[52] U.S. Cl. ............................................ 711/167; 395/559
[58] Field of Search ............................ 395/500, 250, 395/550, 425, 559; 370/60; 711/167

[56] References Cited

U.S. PATENT DOCUMENTS

| | | | |
|---|---|---|---|
| 4,040,026 | 8/1977 | Gernelle | 395/275 |
| 4,193,123 | 3/1980 | Meinke | 395/575 |
| 4,288,860 | 9/1981 | Trost | 395/425 |
| 4,322,844 | 3/1982 | Fellinger et al. | 370/84 |
| 4,344,132 | 8/1982 | Dixon et al. | 395/250 |
| 4,423,482 | 12/1983 | Hargrove et al. | 395/325 |
| 4,463,443 | 7/1984 | Frankel et al. | 395/250 |
| 4,860,193 | 8/1989 | Bentley et al. | 395/250 |
| 4,945,510 | 7/1990 | Maeda et al. | 395/575 |
| 4,965,794 | 10/1990 | Smith | 370/105.1 |
| 5,113,368 | 5/1992 | Le Calvez et al. | 395/250 |

OTHER PUBLICATIONS

IBM Technical Disclosure Bulletin, vol. 15, No. 1 Jun. 1972, pp. 111–113.

IBM Technical Disclosure Bulletin, vol. 9, No. 10, Mar. 1967, pp. 1334–1335.

*Primary Examiner*—Thomas G. Black
*Assistant Examiner*—Jack M. Choules
*Attorney, Agent, or Firm*—Joscelyn G. Cockburn

[57] ABSTRACT

A circuit arrangement synchronizes data transfers between a first device and a second device operating at different data rates. The circuit arrangement is comprised of a plurality of registers for storing data received from a device with the higher data rate. A scan logic circuit counts strobe pulses provided by the device with the higher data rate when data is available on its output bus. Selected counts from the scan logic circuit cause data on the output bus to be sequentially transferred into the plurality of registers. Strobe latch logic keeps track of the loading sequence and, in response thereto, select logic and gate arrangement causes the content of a selected register to be transferred to an output register at each clock signal of the slower device.

4 Claims, 5 Drawing Sheets

CIRCUIT FOR SYNCHRONIZING DATA TRANSFERS BETWEEN TWO DEVICES OPERATING AT DIFFERENT SPEEDS

This is a continuation of U.S. application Ser. No. 07/491,901, filed Mar. 12, 1990, now abandoned.

DESCRIPTION OF THE INVENTION

1. Field of the Invention

This invention relates to a circuit that allows data to be transferred between two devices operating at different speeds.

2. Background of the Invention

In the data processing systems, a synchronization of data transfers between devices working at different speeds, such as a memory and a processor is generally required. In such systems, the first device, i.e the memory has an average data rate which is relatively slow, while being able of delivering data in fast bursts for a short period of time, at a higher data rate.

In fact, the first access to a dynamic memory is made at a slow, and the following ones which are performed in page mode, or in static column mode, can be performed at a higher rate, that can even overrun the processor.

For example, the second device, i.e. the processor uses the memory to update a Cache memory as quickly as possible after a "cache miss" has occurred. In order to minimize the wasted time during which the processor is waiting for the information from the backing store, one must run the memory at its fastest rate. Running the memory at its fastest possible rate also allows freeing it more quickly, such that it can be used more longer to serve other users through a direct memory access port.

Because they are totally different on a design and technology viewpoint, the memory and processor have their own optimum cycle. Unless one of the device is slowed to match the cycle of the other, a synchronization logic is required.

The synchronization is quite easy when the memory device is significantly slower than the processor cycle. When the ratio of the processor rate over the maximum data rate of the memory (in bursts) is equal or larger than 2, then the synchronization is simple since two cycles are allowed to synchronize and transfer the data.

If the ratio is comprised between 1 and 2, the synchronization and transfer of the data must be accomplished in the same cycle which is much more difficult to achieve.

If the ratio is below 1, the synchronization device will require some kind of temporary buffering. Obviously, the average throughput of the memory will stay below the throughput of the processor. The function of the temporary buffers is to cope with the bursts of data delivered by the memory, that may for a while, overrun the processor.

OBJECT OF THE INVENTION

An object of the present invention is a circuit which synchronizes the transfers of data between a first and a second devices, when said devices operate at different speeds.

Another object of the present invention is such a circuit which synchronizes the transfers of data between a first and a second device, and which is operable with any ratio between the data rates of the first and second devices.

SUMMARY OF THE INVENTION

In general, the synchronization circuit allows the transfer of data bursts from a first device operating at a first data rate to a second device, operating at a second data rate, when the first data rate is momentarily higher than the second data rate. The synchronization circuit comprises R buffer registers (210), R being equal to $T+(T-1)\times(B-1)$, where T is the maximum number of transfers which may occur in a clock period of the second device and B is the number of consecutive periods where said maximum number of transfers can take place. The data is received from the first device on bus 3, with a strobe in signal indicating that data is available to be transferred and is sequentially loaded into the registers, under control of loading signals on bus 224, activated by scan logic circuit 222 which counts the strobe in pulses from 1 to $R\times(R+1)$. Strobe latch logic 244 keep track of the loading sequence and in response thereto, select logic 240 and gate arrangement 234 cause the content of a selected register to be transferred in output register 232 at each clock signal of the second device, in such a way that the data provided by the first device are transferred to the second device in the correct sequence. The present invention relates to a circuit for synchronizing the transfers of data between a first device and a second device which operate at different data rates, the first device providing data on an output bus at a first rate together with strobe signals (STROBE IN 4) signals indicative that data are available to be transferred, the second device being able to receive data at a second rate under control of clock signals, said circuit being characterized in that it comprises:

at least R buffer registers, R being an integer number equal to $T+(T-1)\times(B-1)$, where T is the maximum number of data that can be provided by the first device in a period of the clock signal and B is the number of consecutive periods during which the first device can provide the maximum number of data, counting means for generating $R\times(R+1)$ distinct values in response to the strobe signals applied thereto, decoding means for generating signals representative of the values taken by the counting means and active loading signals used to cause the data from the first device that are available at each strobe signal to be loaded in a register selected among the buffer registers in a fixed sequence, gating means for selectively gating the data from the first device into the buffer registers in response to said active loading signals, storing means responsive to the strobe signals, the clock signals and the signals representative of the values taken by the counting means, for keeping track of those buffer registers which contain data from the first device and of the sequence in which they were loaded.

selection means responsive to said storing means and to the signals representative of the values taken by the counting means for selectively gating the data from the buffer registers to the second device, in such a way that the data are provided to the second device in the same sequence as they were provided by the first device.

In a preferred embodiment of the invention the counting means comprises a counter which is incremented by the strobe in pulses from an initial value 1 to a final value $R\times L$ with $L=(R+1)$ which cyclically defines L sets of R values, 1 to R, R+1 to 2×R, ... (L−1)×R+1 to R×L. The decoding means are responsive to the values taken by the counter and generates R loading signals, which are sequentially active in response to the first, second, third ... and last values of the L sets of values to cause the data received on the output bus to be loaded in the first, second, third, ... and last buffer registers, (R1, R2, ... Rr) respectively.

The storing means comprises an assembly of L latches which are sequentially set when data are loaded in a buffer register, in such a way that no more that L−1 latches are simultaneously set, unless an overrun condition occur, said latches being sequentially reset each time data is transferred from a buffer register to the second device, so that the signals representative of the values taken by the counter together with the number of set latches among the L latches are representative of which buffer registers contain data from the first device and of the sequence in which they were loaded.

DETAILED DESCRIPTION OF THE INVENTION

Figure 1:
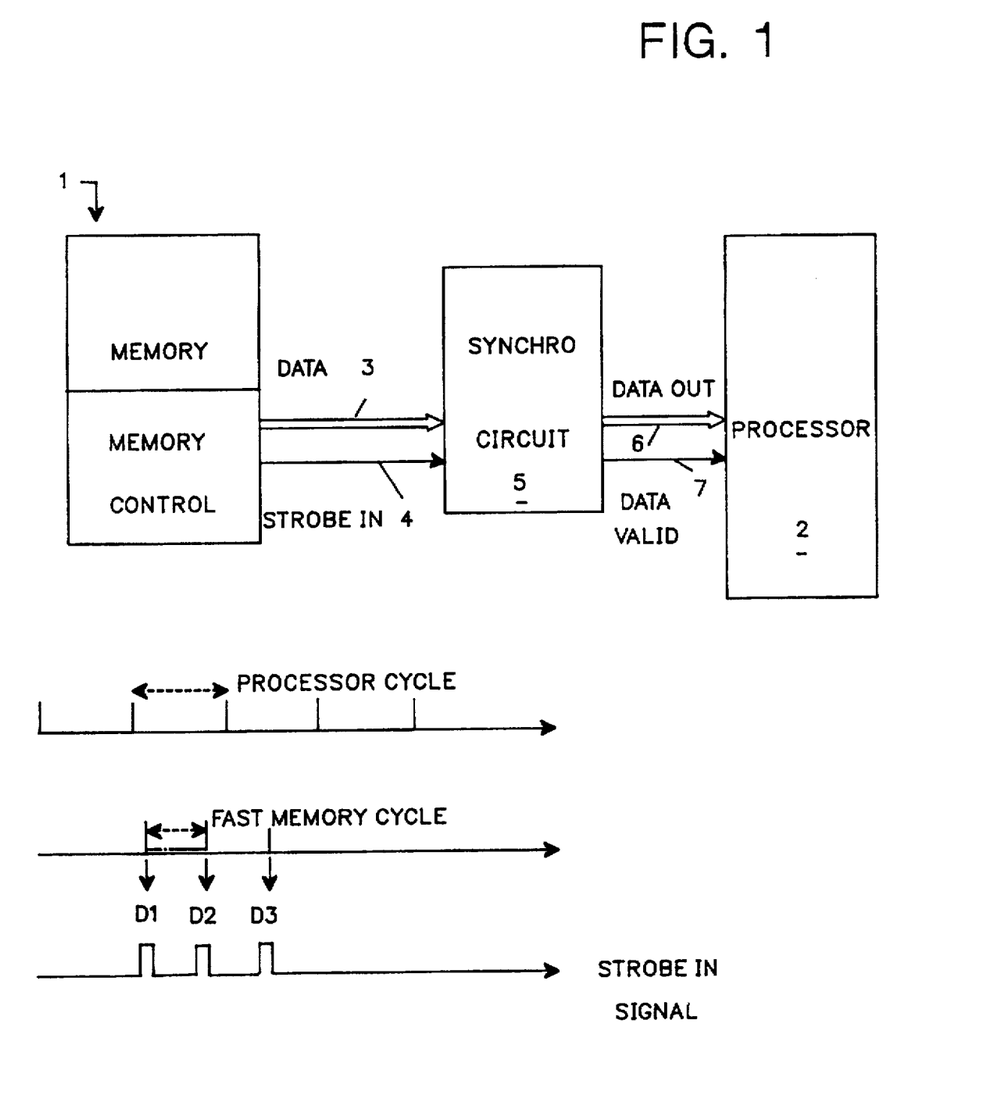
FIG. 1 represents the block diagram of the system incorporating the present invention, together with a timing diagram.

FIG. 1 represents schematically, a first device 1 which transfers data to a second device 2 through a data bus 3. In a preferred embodiment of the invention, the first device is a memory together with its memory control and the second device is a processor. The data read from the memory may, for a while, be provided at a rate which overrun the processor.

The memory control circuit in device 1 provides the data read from the memory on bus 3 together with a STROBE IN signal on line 4, which comprise an active pulse each time a data is available to be transferred as shown in FIG. 1.

According to the present invention, the data bus 3 and STROBE IN line 4 are provided to a synchronization circuit 5, which generates the data to be transferred to the processor on its output bus 6 together with a DATA VALID signal on line 7, which is activated by circuit 5 to indicate to the processor 2 that the data on data out bus 6 may be received by the processor.

The synchronization circuit 5 will be described in reference to FIGS. 2 and 3, assuming that up to three transfers are performed from the memory 1 at a rate which is slightly below twice the processor rate, as shown in FIG. 1. As shown in this Figure, a maximum number of two data entities may be provided by the memory in one processor cycle, with less than two data entities provided in the adjacent cycles.

In this environment, two temporary buffer registers R1 and R2 which are referenced by 10 and 12 respectively, are provided to receive the data from the memory. The data are loaded from bus 3 into buffer register R1 10 under control of an active gating signal generated on output line 14 of an AND gate 16. The data are loaded from bus 3 into buffer register R2 12 under control of an active gating signal generated on output line 18 of an AND gate 20.

AND gate 16 is conditioned by the active STROBE IN pulses on line 4 and by an active LOAD R1 register signal on line 24. AND gate 20 is conditioned by the active STROBE IN pulses on line 4 and by an active LOAD R2 register signal on line 26. A scan logic circuit 22 activates lines 24 and 26 as will be described later on.

Scan logic circuit 22 comprises a counter 28 which is incremented by the STROBE IN pulses on line 4 and a decode circuit 30 which is responsive to the counter values to activate the lines 24 and 26.

The data are transferred from register 10 or 12 into data out register 32 through gating arrangement 34 which is controlled by an active signal on line 36 or 38. The signal on line 36 is a SELECT R1 TO TRANSFER signal which causes the content of register 10 to be transferred to data out register 32 and the signal on line 38 is a SELECT R2 TO TRANSFER signal which causes the content of register 12 to be transferred to data out register 32. These signals are activated by SELECT logic circuit 40 as a function of the values of counter 28, as decoded by decode circuit 30 and provided to SELECT logic 40 through bus 42.

Figure 2:
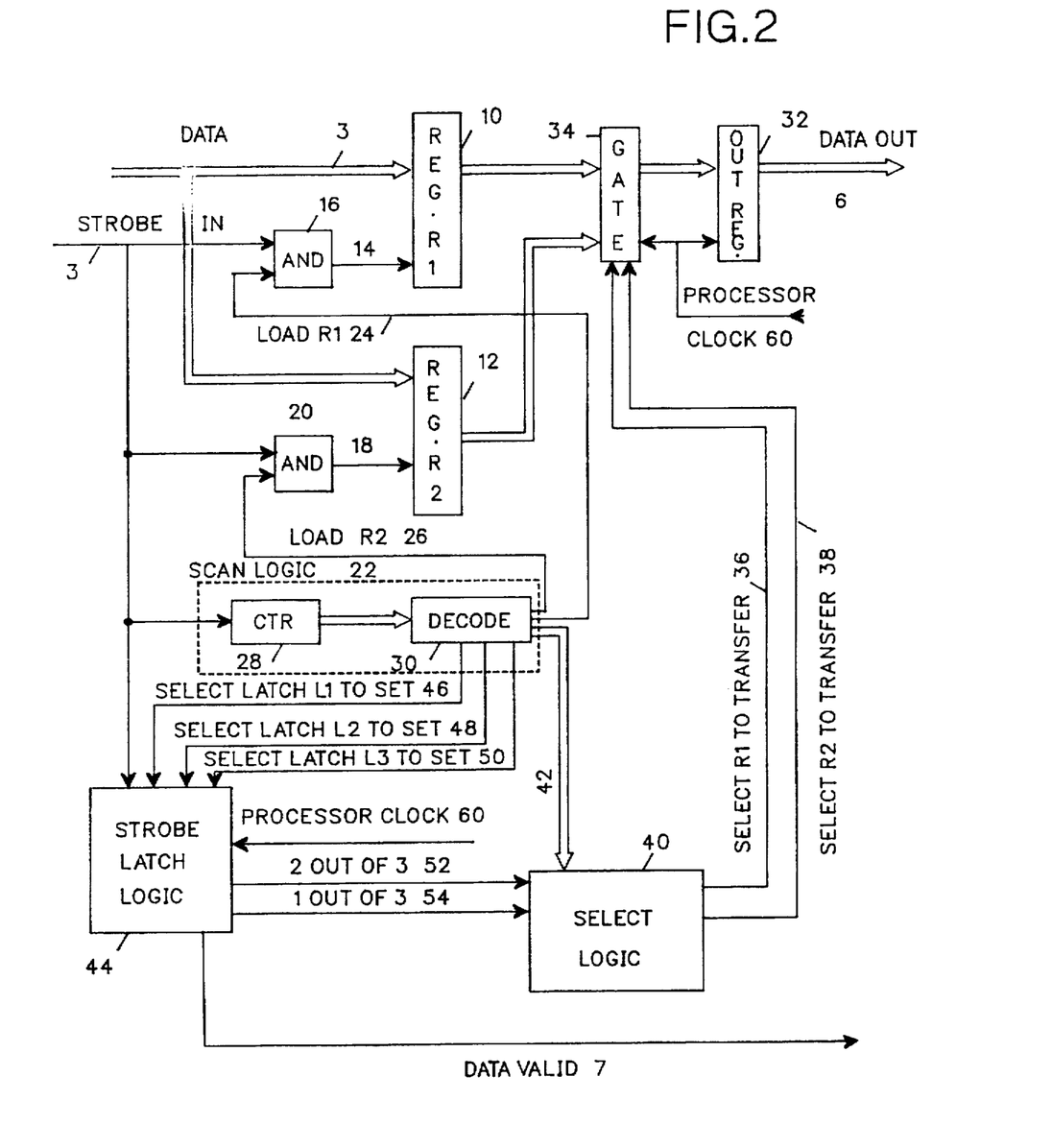
FIG. 2 represents the block diagram of the synchronization circuit for a specific ratio of the data rates of the first and second devices.
Figure 3:
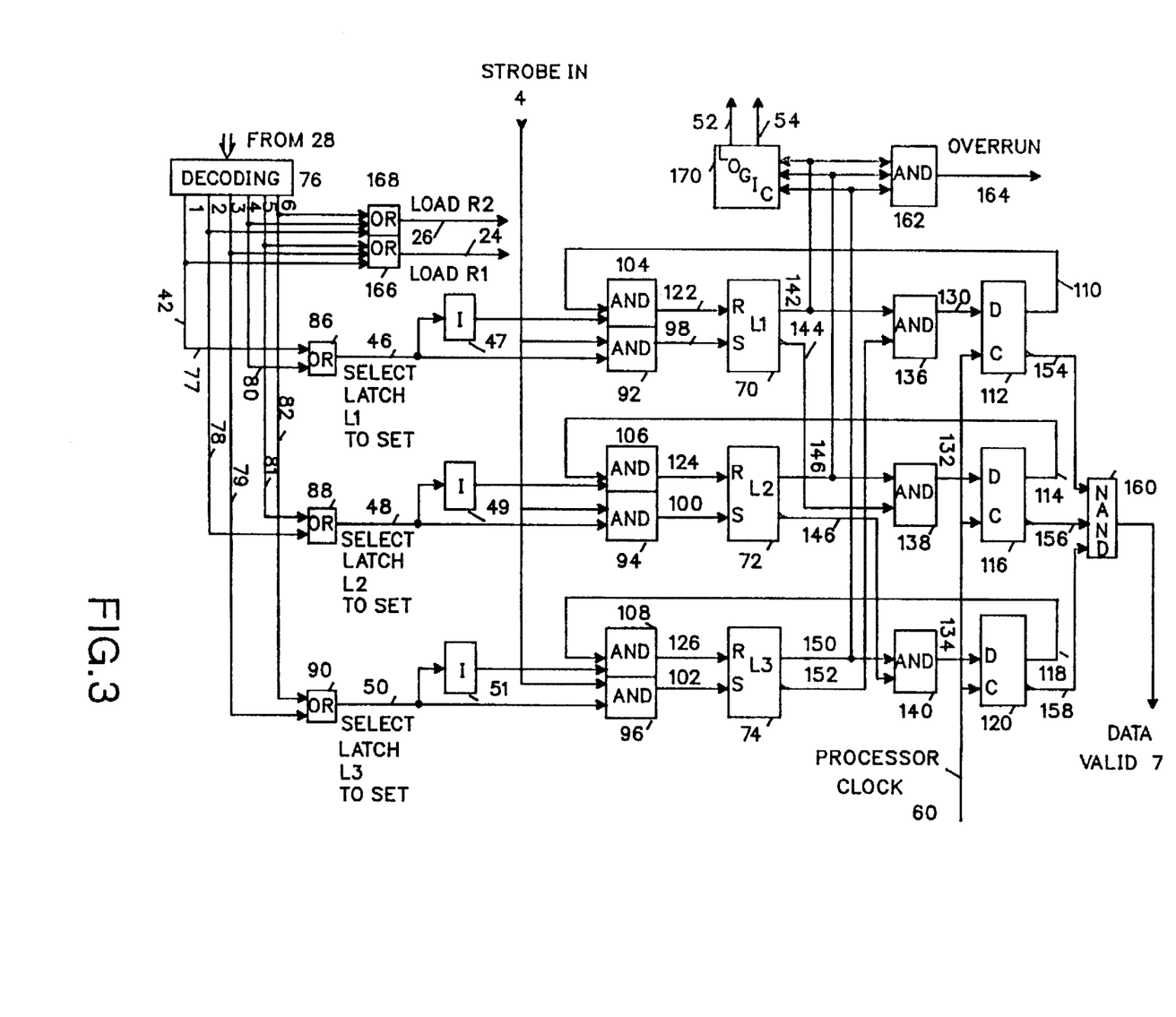
FIG. 3 represents the block diagram of the strobe latch circuit 44 of FIG. 2.

Strobe latch logic circuit 44 which will be described later on in reference to FIG. 3 is responsive to the STROBE IN signal on line 4 and SELECT LATCH TO SET signals generated by decode circuit 30 on lines 46, 48, and 50.

Strobe latch logic circuit 44 provides selection control signals on lines 52 and 54 and activates the data valid line 7.

In response to the signals on lines 42, 52 and 54, SELECT logic 40 activates line 36 or 38 as will be described later.

A clock signal from processor 2 is provided to strobe latch logic circuit 44 and to register 32 on line 60.

Figure 4:
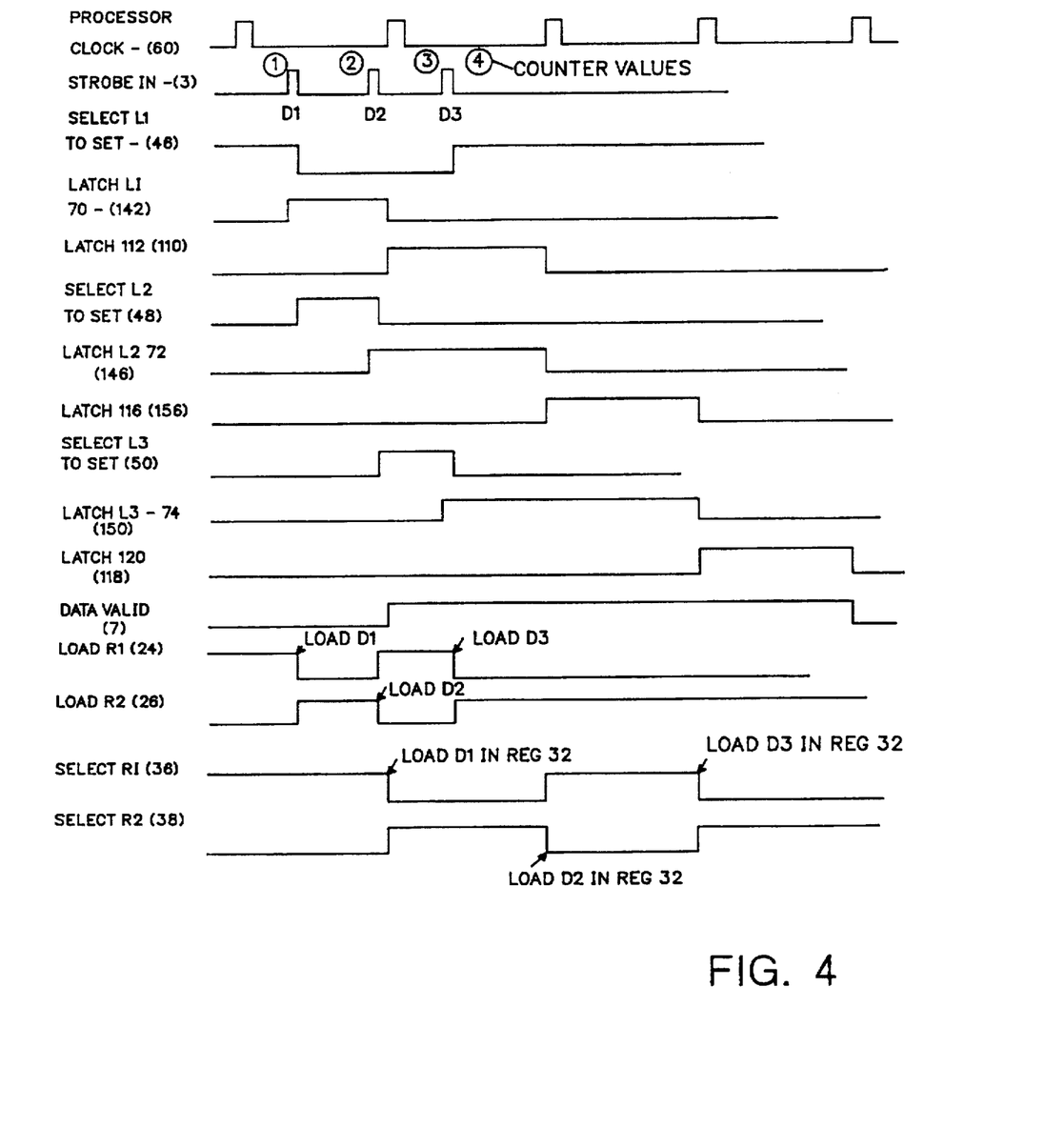
FIG. 4 represents a timing diagram showing the operation of circuit 44.

Before describing the operation of the synchronization circuit 5 strobe latch logic circuit 44, shown in FIG. 3, will be described. The status of the signals at the output of the components of circuit 44 are shown in FIG. 4.

In the specific implementation of the invention, wherein two data strobe in pulses may occur in a processor cycle, as shown in FIG. 1, the strobe latch logic circuit 44 (FIG. 2) comprises three strobe latches L1, L2 and L3 referenced 70, 72 and 74 (FIG. 3).

In the preferred embodiment of the invention, counter 28 counts from an initial value 1, it is incremented at each strobe in pulse.

When counter 28 reaches a value which is equal to the number of buffer registers multiplied by the number of strobe latches, i.e "6" in the specific implementation of the invention shown in the FIGS. 2 and 3, it is reset to the initial value, i.e. 1. This counter 28 takes 6 distinct values.

Consequently, decode circuit 30, comprises a decoding circuit 76 which activates one of its output lines 77 to 82 when the counter value is "1", "2" ... "5", "6" respectively.

Lines 77 and 80 which are activated when the counter value is "1" and "4" respectively, are provided to OR gate 86 which generates the SELECT LATCH L1 TO SET signal on its output line 46.

Lines 78 and 81 which are activated when the counter value is "2" and "5" respectively, are provided to OR gate 88 which generates the SELECT LATCH L2 TO SET signal on its output line 48.

Lines 79 and 82 which are activated when the counter value is "3" and "6" respectively, are provided to OR gate 90 which generates the SELECT LATCH L3 TO SET signal on its output line 50.

One of the inputs of AND gates 92, 94 and 96 are connected to STROBE IN line 4 and the other inputs are connected to lines 46, 48 and 50, respectively. The active signals on the output lines 98, 100, 102 of AND gates 92, 94 and 96 set the latches 70, 72 and 74 respectively.

So, latch L1 70 is set at the first strobe in pulse, when data D1 are provided on bus 3, latch L2 72 is set at the second strobe in pulse, when data D2 are provided on bus 3, latch L3 74 is set at the third strobe in pulse, when data D3 are provided on bus 3. In the following data burst which is not shown in FIG. 4, the strobe in pulses will continue to increment the counter and the three data D4, D5 and D6 which will be received will be loaded into register R2, R1 and R2 respectively, as will be shown later on.

The reset signals of latches 70, 72 and 74 are generated by AND gates 104, 106 and 108. One of the inputs of AND gate 104 is connected to the output line of inverter 47, one of the inputs of AND gate 106 is connected to output line of inverter 49 and one of the inputs of AND gate 108 is connected to the output line of inverter 51.

Inverters 47, 49, 51 invert the signals on line 46, 48 and 50. This prevents set and reset control signals to be simultaneously provided to the set and reset inputs of the latches.

The other input of AND gate 104 is connected to the true output line 110 of D-type latch 112. The other input of AND gate 106 is connected to the true output line 114 of D-type latch 116. The other input of AND gate 108 is connected to the true output line 118 of D-type latch 120.

The output lines 122, 124 and 126 of AND gates 104, 106 and 108 are connected to the reset input of strobe latches 70, 72 and 74.

The D-input of latches 112, 116 and 120 are connected to the output lines 130, 132 and 134 of AND gates 136, 138 and 140. The clock input of latches 112, 116 and 120 is connected to the processor clock line 60.

The input lines 142 and 152 of AND gate 136 are the true output line of latch 70 and the complement output line of latch 74. The input lines 146 and 144 of AND gate 138 are the true output line of latch 72 and the complement output line of latch 70 and the input lines 150 and 145 of AND gate 140 are the true output line of latch 74 and the complement output line of latch 72.

The complement output lines 154, 156 and 158 of latches 112, 116 and 120 are connected to the inputs of NAND gate 160 which generates the data valid signal on line 7.

The true output lines 142, 146 and 150 of latches 70, 72 and 74 are connected to AND gate 162 which generates an OVERRUN signal on line 164 when the three strobe latches are set.

Lines 142, 146 and 150 are also connected to logic circuit 170 which activates line 54 when one latch among the three latches 70, 72 and 74 is set and activates line 52 when two latches among the three latches 70, 72 and 74 are set so as to provide the indication of the registers into which data are available to be transferred.

The output lines 77, 79 and 81 of decoding circuit 76 are provided to OR gate 166 the output line of which is the LOAD R1 line 24 and the output lines 78, 80 and 82 of decoding circuit 76 are provided to OR gate 168, the output line of which is the LOAD R2 line 26. The signals on the output lines 24 and 26, which are shown in FIG. 4, cause the loading of the data in registers R1 and R2. Thus, when the counter 28 value reaches 2, at the first strobe in pulse, the data D1 are loaded in register R1, when it reaches 3, at the second strobe in pulse, data D2 are loaded in register R2 and when it reaches 4 at the third pulse, data D3 are loaded in register R1.

The strobe latch logic circuit shown in FIG. 3 allows the strobe latches 70, 72 and 74 to be set sequentially and to be reset in the right order so as to assure a proper transfer of the data to the processor. No data buffer register inversion must occur when two strobe latches are set during the same processor cycle. The first strobe latch to be reset is the one that was first set and the corresponding data transferred during the next processor cycle. Moreover no two strobe latches should be reset simultaneously.

This is performed by the circuit shown in FIG. 3, the operation of which is summarized in the following tables.

TABLE 1

| VALUE REACHED BU COUNTER | REGISTER R1 or R2 10 or 12 TO LOAD | STROBE LATCH A-70 B-72 or C-74 | |
|---|---|---|---|
| | | TO SET | TO RESET |
| 1 | R1 | L1 | L2 or L3 |
| 2 | R2 | L2 | L3 or L1 |
| 3 | R1 | L3 | L1 or L2 |
| 4 | R2 | L1 | L2 or L3 |
| 5 | R1 | L2 | L3 or L1 |
| 6 | R2 | L3 | L1 or L2 |

The operations illustrated in Table 1 are performed by means of OR gates 166 and 168, which generates the LOAD R1 signal on line 24 or the LOAD R2 signal on line 26, and by OR gates 86, 88 and 90, and AND gates 92, 94, 104, 106 and 108.

AND gates 136, 138 and 140 and latches 112, 116 and 120 assure the proper resetting of strobe latches 70, 72 and 74 according to the following table.

TABLE 2

| TRUE OUTPUT OF LATCHES | | | SET | NEXT LATCH |
|---|---|---|---|---|
| L3-74 | L2-72 | L1-70 | LATCH | TO RESET |
| 0 | 0 | 0 | | |
| 0 | 0 | 1 | L1 | L1 |
| 0 | 1 | 0 | L2 | L2 |
| 0 | 1 | 1 | L1 the L2 | L1 |
| 1 | 0 | 0 | L3 | L1 |
| 1 | 0 | 1 | L3 then L1 | L3 |
| 1 | 1 | 0 | L2 then L3 | L2 |
| 1 | 1 | 1 | Overrun | L2 |

Selection circuit 40 is responsive to the values reached by counter 28 and provided on bus 42 by the decode circuit 30, and to the signals on lines 52 and 54 to generate selection signals on SELECT R1 TO TRANSFER line 36 or on SELECT R2 to TRANSFER line 38.

The function of circuit 40 is to guarantee that the data D1, D2, D3 which are temporarily buffered in register R1 or R2 in accordance with the sequence shown in the table 1, transferred in the output register 32 in the correct sequence D1, D2, D3.

The transfer rule, which depends upon the counter value and upon the number of set latches is shown in the table 3.

TABLE 3

| NEXT REGISTER TO BE LOADED | VALUE REACHED BY COUNTER | NUMBER OF SET LATCHES | SELECT REGISTER R1 OR R2 |
|---|---|---|---|
| R1 | 1 | 1 | R2 |
|    |   | 2 | R1 |
| R2 | 2 | 1 | R1 |
|    |   | 2 | R2 |
| R1 | 3 | 1 | R2 |
|    |   | 2 | R1 |
| R2 | 4 | 1 | R1 |
|    |   | 2 | R2 |
| R1 | 5 | 1 | R2 |
|    |   | 2 | R1 |
| R2 | 6 | 1 | R1 |
|    |   | 2 | R2 |

The select lines are provided to gate arrangement 34 to transfer the data contained in the selected register R1 or R2 into the output register 32 under the control of the processor clock signal on line 60, as shown in FIG. 4.

The timing of the FIG. 4 shows the status of lines 24 and 26, 34 and 36 and line 7, to perform the three data transfers to output register 32.

It will now be described how the invention may be implemented to accommodate different ratios between the rate of the data provided by the memory and the rate at which the processor may receive the said data.

In all cases, the number of buffer registers, like R1 and R2 will depend upon T and B, where T is the maximum number of transfers in a period of the processor clock and B the number of consecutive periods wherein a maximum number of transfers can occur depending upon the ratio of the data rates of the first and second devices. In the specific implementation of the invention described in reference to the FIGS. 1 to 4, T is equal to 2 and B is equal to 1.

The number R of buffer registers R1, R2 to Rr is equal to:

$$R=T+(T-1)\times(B-1)$$

The number L of strobe latches L1 to Ll is equal to:

$$L=R+1$$

In preferred implementations of the invention, the counter is a modulo R×L counter which is incremented by the strobe in pulses from 1 up to R×L so as to take R×L distinct values.

Figure 5:
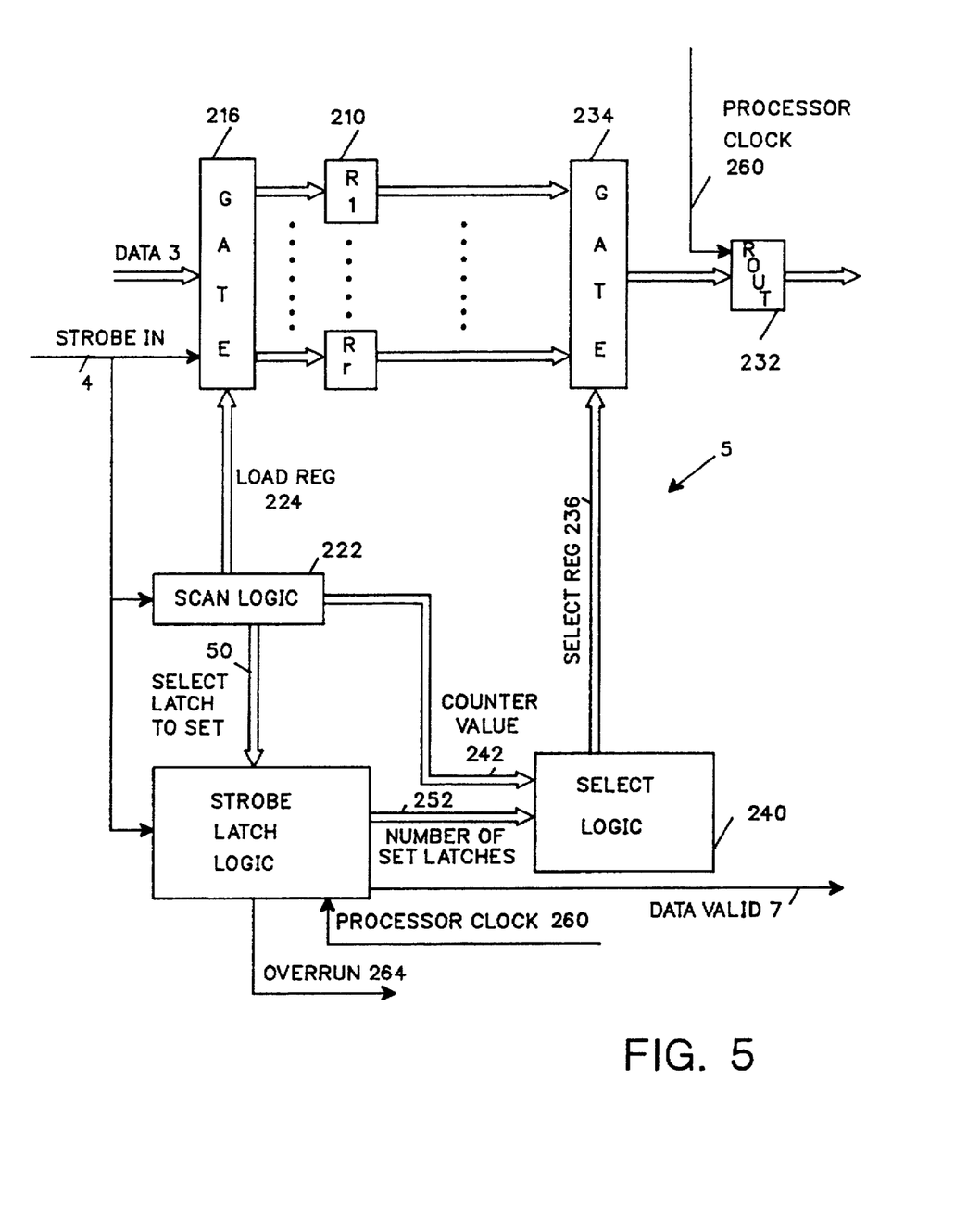
FIG. 5 represents the block diagram of a synchronization circuit which can be adapted in accordance with the data rate ratio.

FIG. 5 shows a synchronization circuit 5 which can be adapted as a function of the data rate ratios. This circuit comprises the same components as the circuit 5 shown in FIG. 2. The correspondence between the components in FIGS. 2 and 5 is the following.

The gating arrangement 216 has the same function as AND gates 16 and 20. R registers R1 to Rr constitute the buffer register arrangement 210 which has the function of registers R1 10 and R2 12 and 12. The scan logic 222 has the same function as logic 22 except that it counts up to R×L, it generates LOAD REGISTER signals on bus 224.

A strobe latch logic 244 which comprises R+1 latches, set and reset by signals generated by scan logic 222 on SELECT LATCH to SET bus 250 provides the DATA VALID signals on line 7, in the same way as strobe latch logic 44 of FIG. 2.

Depending upon the signals on bus 224 and on the number of latches which are set in scan logic circuit 244, as indicated by signals on bus 252, a select logic 240 similar to logic 40 of FIG. 2, activates SELECT register signals on bus 236, which are provided to a gate arrangement 234, to transfer the content of a register selected among registers R1 to Rr into output register 232 (similar to register 32 of FIG. 2), to transfer the data on output bus 6 under control of the processor clock signal on line 260.

The data on bus 3 are alternatively loaded in a register selected among registers R1 to Rr, the selection depends upon the value of the counter in scan logic 222. Because the counter counts from 1 to R×L, there are L sets or R successive values and R sets of L successive values.

The L sets of R values are the following:

$$1 \text{ to } R, R+1 \text{ to } 2R, 2R+1 \text{ to } 3R \ldots (L-1)\times R+1 \text{ to } R\times L.$$

Bus 224 comprises R lines each one being activated to load a selected register among registers R1 to Rr.

The LOAD REGISTER R1 line is activated when the counter is at the following values:

$$1 \text{ OR } 1+R \text{ OR } (1+2R) \text{ OR } \ldots \text{ OR } 1+(L-1)\times R$$

The LOAD REGISTER R2 line is activated when the counter is at the following values:

$$2 \text{ OR } (2+R) \text{ OR } (2+2R) \text{ OR } \ldots \text{ OR } 2+(L-1)\times R$$

The LOAD REGISTER Rr line is activated when the counter is at the following values:

$$R \text{ OR } (R+R) \text{ OR } (R+2R) \text{ OR } \ldots \text{ OR } R+(L-1)\times R$$

The R sets of L successive values of the counter are $$1 \text{ to } L, L+1 \text{ to } 2L \ldots (R-1)\times L \text{ to } R\times L$$

Bus 250 comprises L lines which are activated to set a selected latch among latches L1 to Ll and prepare the resetting of latches L2 to Ll and L1 respectively.

SELECT LATCH L1 to SET line is activated when the counter is at the following values:

$$1 \text{ OR } (1+L) \text{ OR } (1+2L) \text{ OR } \ldots \text{ OR } 1+(R-1)\times L$$

SELECT LATCH L2 to SET line is activated when the counter is at the following values:

$$2 \text{ OR}(2+L) \text{ OR } (2+2L) \text{ OR } \ldots \text{ OR } 2+(R-1)\times L$$

SELECT LATCH Ll to SET line is activated when the counter is at the following values:

$$L \text{ OR } (L+L) \text{ OR } (L+2L) \text{ OR } \ldots \text{ OR } L+(R-1)\times L$$

Except in case of overruns, the number of strobe latches which are simultaneously set at each strobe in pulse is equal or lower to L−1.

Bus 252 comprises L−1 lines, which are activated to indicate how many strobe latches are set. Depending upon this number and upon which line is activated in bus 242 (which is similar to bus 42 of FIG. 2), select logic 240 activates one of the R lines of bus 236 to transfer the content of one selected register into the data out register 232.

The following table indicates which SELECT REGISTER (R1 to Rr) to TRANSFER line is activated as a function of counter values provided on bus 142 of the number of latches which are set, as shown in table 4.

TABLE 4

| COUNTER VALUE | NEXT REGISTER TO LOAD | NUMBER OF STROBE LATCHES SET | SELECT TO TRANSFER |
|---|---|---|---|
| 1 | R1 | 1 | Rr |
|   |    | 2 | Rr-1 |
|   |    | 3 | Rr-2 |
|   |    | . | . |
|   |    | L-1 | R1 |
| 2 | R2 | 1 | R1 |
|   |    | 2 | Rr |
|   |    | 3 | Rr-1 |
|   |    | . | . |
|   |    | L-1 | R2 |
| 3 | R3 | 1 | R2 |
|   |    | 2 | R1 |
|   |    | 3 | Rr |
|   |    | 4 | Rr-1 |
|   |    | . | . |
|   |    | L-1 | R3 |
| R | Rr | 1 | Rr-1 |
|   |    | 2 | Rr-2 |
|   |    | 3 | Rr-3 |
|   |    | . | . |
|   |    | L-2 | R1 |
|   |    | L-1 | Rr |

From the previous description, it will be easy for the man skilled in the art to design the synchronization circuit 5, to synchronize the data transfers between two devices.

Obviously, a number of clock periods are required after a data burst has been provided by the first device 1 to transfer all the data bufferized in the registers R1, R2 or R1 to Rr. During that time, the memory is available and can be used for other purposes. In case of overrun detection, which is detected at the output 164 of AND gate 162 (FIG. 3) or on line 264 (FIG. 5), when all the strobe latches are set, an error is reported. However, this condition should never occur if the synchronization circuit is correctly sized.

What is claimed is:

1. A circuit for controlling data transfers between a first device (1) and a second device (2) which operate at different data rates, the first device providing data on an output bus at a first rate together with strobe signals indicating data is available to be transferred, the second device receiving data at a second rate which is the rate of clock signals provided by the second device, comprising:

at least R buffer registers (10, 12; 210) for receiving data from the first device, R being an integer number equal to T+(T−1)×(B−1), where T is a maximum number of data entities that can be provided by the first device in a period of a clock signal and B is a number of consecutive periods during which the first device can provide a maximum number of data entities;

counting means (28; 222) for generating R×(R+1) distinct values in response to the strobe signals applied thereto;

decoding means coupled to the counting means, for generating signals representative of the values generated by the counting means and active loading signals used to cause the data from the first device that are available at each strobe signal to be loaded in a register selected among the buffer registers (R1 to Rr) in a fixed sequence;

gating means (16, 20, 216), coupled to the buffer registers for selectively gating the data from the first device into the buffer registers in response to said active loading signals;

storing means (44), responsive to the strobe signals, the clock signals provided by the second device and the signals representative of the values generated by the counting means, for keeping track of those buffer registers which contain data from the first device and of the sequence in which the buffer registers were loaded, said storage means including an assembly of L latches having a set and reset status, said latches being sequentially set when data are loaded in at least one buffer register, in such a way that no more than L−1 latches are simultaneously set, unless an overrun condition occurs, said latches being sequentially reset each time data are transferred from a selected buffer register to the second device, so that signals representative of the values of the counter together with the number of set latches among the L latches are representative of which buffer registers contain data from the first device and of the sequence in which the L latches were loaded and set latch control means, (86,92; 88,94; 90,96) responsive to the strobe signals and to the signals representative of the values taken by the counter to generate set control signals (SELECT LATCH TO SET) which sequentially set the L latches in accordance with the fixed loading sequence of the buffer registers;

selection means (40, 34; 240, 234) responsive to signals outputted from said storing means and to the signals representative of the values generated by the counting means for selectively gating the data from the buffer registers to the second device, in such a way that the data are provided to the second device in the same sequence as they were provided by the first device; and an overrun detection means (162) responsive to the status of the L latches for generating an overrun indication when all of the L latches are set.

2. A circuit for controlling data transfers between a first device (1) and a second device (2) which operate at different data rates, the first device providing data on an output bus at a first rate together with strobe signals indicating data is available to be transferred, the second device receiving data at a second rate which is the rate of clock signals provided by the second device, comprising:

at least R buffer registers (10, 12; 210) for receiving data from the first device, R being an integer number equal to T+(T−1)×(B−1), where T is a maximum number of data entities that can be provided by the first device in a period of a clock signal and B is a number of consecutive periods during which the first device can provide a maximum number of data entities;

counting means (28; 222) for generating R×(R+1) distinct values in response to the strobe signals applied thereto;

decoding means coupled to the counting means, for generating signals representative of the values generated by the counting means and active loading signals used to cause the data from the first device that are available at each strobe signal to be loaded in a register selected among the buffer registers (R1 to Rr) in a fixed sequence;

gating means (16, 20, 216), coupled to the buffer registers for selectively gating the data from the first device into the buffer registers in response to said active loading signals;

storing means (44), responsive to the strobe signals, the clock signals provided by the second device and the signals representative of the values generated by the counting means, for keeping track of those buffer registers which contain data from the first device and of the sequence in which the buffer registers were loaded, wherein said storage means including an assembly of L latches having a set and reset status, said latches being sequentially set when data are loaded in at least one buffer register, in such a way that no more than L−1 latches are simultaneously set, unless an overrun condition occurs, said latches being sequentially reset each time data are transferred from a selected buffer register to the second device, so that signals representative of the values of the counter together with the number of set latches among the L latches are representative of which buffer registers contain data from the first device and of the sequence in which the L latches were loaded;

selection means (40, 34; 240, 234) responsive to signals outputted from said storing means and to the signals representative of the values generated by the counting means for selectively gating the data from the buffer registers to the second device, in such a way that the data are provided to the second device in the same sequence as they were provided by the first device; and validation means responsive to the status of the L latches and the clock signals for providing a data valid signal to the second device when data can be transferred to the second device.

3. A circuit for controlling data transfers between a first device (1) and a second device (2) which operate at different data rates, the first device providing data on an output bus at a first rate together with strobe signals indicating data is available to be transferred, the second device receiving data at a second rate which is the rate of clock signals provided by the second device, comprising:

at least R buffer registers (10, 12; 210) for receiving data from the first device, R being an integer number equal to T+(T−1)×(B−1), where T is a maximum number of data entities that can be provided by the first device in a period of a clock signal and B is a number of consecutive periods during which the first device can provide a maximum number of data entities;

counting means (28; 222), comprising a modulo-R×L, counter (22) which is incremented by the strobe signals from a first value (1) to a last value R×L with L=(R+1), which defines L sets of R values, 1 to R, R+1 to 2×R, ... (L−1)×R+1 to R×L, for generating R×(R+1) distinct values in response to the strobe signals applied thereto;

decoding means coupled to the counting means, for generating signals representative of the values generated by the counting means and active loading signals used to cause the data from the first device that are available at each strobe signal to be loaded in a register selected among the buffer registers (R1 to Rr) in a fixed sequence;

gating means (16, 20, 216), coupled to the buffer registers for selectively gating the data from the first device into the buffer registers in response to said active loading signals;

storing means (44), responsive to the strobe signals, the clock signals provided by the second device and the signals representative of the values generated by the counting means, for keeping track of those buffer registers which contain data from the first device and of the sequence in which the buffer registers were loaded, said storage means including an assembly of L latches having a set and reset status, said latches being sequentially set when data are loaded in at least one buffer register, in such a way that no more than L−1 latches are simultaneously set, unless an overrun condition occurs, said latches being sequentially reset each time data are transferred from a selected buffer register to the second device, so that signals representative of the values of the counter together with the number of set latches among the L latches are representative of which buffer registers contain data from the first device and of the sequence in which the L latches were loaded and set latch control means, (86,92; 88,94; 90,96) responsive to the strobe signals and to the signals representative of the values taken by the counter to generate set control signals (SELECT LATCH TO SET) which sequentially set the L latches in accordance with the fixed loading sequence of the buffer registers;

selection means (40, 34; 240, 234) responsive to signals outputted from said storing means and to the signals representative of the values generated by the counting means for selectively gating the data from the buffer registers to the second device, in such a way that the data are provided to the second device in the same sequence as they were provided by the first device; and an overrun detection means (162) responsive to the status of the L latches for generating an overrun indication when all of the L latches are set.

4. A circuit for controlling data transfers between a first device (1) and a second device (2) which operate at different data rates, the first device providing data on an output bus at a first rate together with strobe signals indicating data is available to be transferred, the second device receiving data at a second rate which is the rate of clock signals provided by the second device, comprising:

at least R buffer registers (10, 12; 210) for receiving data from the first device, R being an integer number equal to T+(T−1)×(B−1), where T is a maximum number of data entities that can be provided by the first device in a period of a clock signal and B is a number of consecutive periods during which the first device can provide a maximum number of data entities;

counting means (28; 222), including a modulo-R×L, counter (22) which is incremented by the strobe signals from a first value (1) to a last value R×L with L=(R+1), which defines L sets of R values, 1 to R, R+1 to 2×R, ... (L−1)×R+1 to R×L, for generating R×(R+1) distinct values in response to the strobe signals applied thereto;

decoding means coupled to the counting means, for generating signals representative of the values generated by the counting means and active loading signals used to cause the data from the first device that are available at each strobe signal to be loaded in a register selected among the buffer registers (R1 to Rr) in a fixed sequence;

gating means (16, 20, 216), coupled to the buffer registers for selectively gating the data from the first device into the buffer registers in response to said active loading signals;

storing means (44), responsive to the strobe signals, the clock signals provided by the second device and the signals representative of the values generated by the counting means, for keeping track of those buffer registers which contain data from the first device and of the sequence in which the buffer registers were loaded, wherein said storate means including an assembly of L latches having a set and reset status, said latches being sequentially set when data are loaded in at least one buffer register, in such a way that no more than L−1 latches are simultaneously set, unless an overrun condition occurs, said latches being sequentially reset each time data are transferred from a selected buffer register to the second device, so that signals representative of the values of the counter together with the number of set latches among the L latches are representative of which buffer registers contain data from the first device and of the sequence in which the L latches were loaded;

selection means (40, 34; 240, 234) responsive to signals outputted from said storing means and to the signals representative of the values generated by the counting means for selectively gating the data from the buffer registers to the second device, in such a way that the data are provided to the second device in the same sequence as they were provided by the first device; and validation means responsive to the status of the L latches and the clock signals for providing a data valid signal to the second device when data can be transferred to the second device.

* * * * *